United States Patent
Rossato et al.

(10) Patent No.: US 6,685,587 B2
(45) Date of Patent: Feb. 3, 2004

(54) HYDRAULIC CHAIN TENSIONER WITH NO-RETURN DEVICE FOR THE PISTON

(75) Inventors: Francesco Rossato, Milan (IT);
Daniele Redaelli, Merate (IT);
Germinal F. Capucci, Carnate (IT)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 09/950,407

(22) Filed: Sep. 11, 2001

(65) Prior Publication Data

US 2003/0008738 A1 Jan. 9, 2003

(30) Foreign Application Priority Data

Sep. 13, 2000 (EP) .............................. 00830616

(51) Int. Cl.[7] ................................. F16H 7/08
(52) U.S. Cl. ....................... 474/109; 474/110
(58) Field of Search .................. 474/109, 110, 474/135, 138, 112, 136, 133, 111, 140, 101

(56) References Cited

U.S. PATENT DOCUMENTS

| | | | | |
|---|---|---|---|---|
| 4,792,322 A | * | 12/1988 | Goppelt et al. | 474/136 |
| 5,700,214 A | * | 12/1997 | Kuznets et al. | 474/110 |
| 5,913,742 A | * | 6/1999 | Nakamura et al. | 474/110 |
| 5,967,921 A | * | 10/1999 | Simpson et al. | 474/110 |
| 6,120,402 A | * | 9/2000 | Preston et al. | 474/109 |
| 6,193,623 B1 | * | 2/2001 | Koch et al. | 474/110 |
| 6,244,981 B1 | * | 6/2001 | Simpson | 474/110 |
| 6,244,982 B1 | * | 6/2001 | Merelli | 474/110 |

FOREIGN PATENT DOCUMENTS

| | | | |
|---|---|---|---|
| DE | 3211095 A1 | * | 10/1982 |
| DE | 3232322 A1 | * | 3/1984 |
| EP | 0 106 325 | | 10/1983 |
| EP | 0989333 A1 | | 9/1999 |
| FR | 71.477454 | | 12/1971 |
| GB | 846162 | | 8/1960 |
| GB | 2233062 A | * | 1/1991 |

* cited by examiner

Primary Examiner—Marcus Charles
(74) Attorney, Agent, or Firm—Brown & Michaels, PC; Greg Dziegielewski

(57) ABSTRACT

A cartridge type hydraulic tensioner for a chain or belt is described comprising a cylinder (11) with an inner bore (13) and a hollow piston (12) sliding in the cylinder and biased outward by an elastic elements and by pressurized fluid fed into said bore (13), at least one rack (20) being formed on the skirt of the piston (12) and engaged by a toothed pad (21) passing through a corresponding aperture (22) formed in the wall of the cylinder and biased against the rack by an annular spring (25) housed in an annular seat (24) formed in the skirt of the cylinder (11) without protruding from the bulk of the cylinder.

14 Claims, 6 Drawing Sheets

HYDRAULIC CHAIN TENSIONER WITH NO-RETURN DEVICE FOR THE PISTON

The present application claims priority to, and benefit under 35 USC §119(a)–(d) of, the European Patent Application No. 00830616.9, filed Sep. 13, 2000.

BACKGROUND OF THE INVENTION

1. Field of the Invention

The invention refers to devices for tensioning drive transmission means, such as chains. In particular reference will be made to chain transmission means on vehicles.

2. Description of Related Art

A timing system of an internal combustion engine can be controlled by means of a chain drive, in which a chain is wound on two or more sprockets, one of which is a driving sprocket and takes the motion from the crankshaft to transmit it to the camshaft.

Since for reasons of adjustment, wear on materials and take-up of slack it is often necessary to compensate for a certain looseness on the chain, the use of shoe tensioning devices is known to the art, in which a shoe is biased with an adjustable force against a run or branch of the chain.

Various means are known for biasing the tensioning shoe against the chain. Among these, the most frequently used are cylinder/piston tensioners, in which a fixed member of a cylinder/piston assembly (generally the cylinder) is mounted on the engine block and a movable member (generally the piston) is slidable with respect to the fixed members and acts against the shoe placed in contact with the chain, to tension it.

In these tensioning devices, the piston is pushed out of the cylinder, towards the shoe disposed against a run of the chain by the combined action of a spring and of pressurized oil fed into the cylinder chamber. Any slackening of the chain due to heating, wear and time is compensated by the piston extending out of the cylinder, under the action of said biasing means.

Said tensioning devices can be further divided into two categories: those that are disposed inside the engine block, and therefore require opening of the engine for fitting and, if necessary, for removal, and those of the so-called cartridge type, which are screwed into the engine block or the head from the outside, these latter devices undoubtedly being more convenient as far as ease of fitting and removal is concerned, in that opening of the engine is not necessary.

The invention refers in particular to this second type.

It sometimes happens, especially during starting of the engine, that the cylinder chamber is completely or partially emptied of oil. In this case, the force of the pressure spring alone may not be sufficient to keep the chain under control. Thus flapping of the chain is generated, which tends to push the piston inside the cylinder, until the oil in the cylinder reaches working pressure, which may take a few seconds. This flapping of the chain, besides producing an annoying noise, can in the long run cause damage to the whole chain drive assembly, including the tensioner.

In order to avoid this drawback, no-return devices for the piston have been proposed, which are easily applied in tensioning devices situated inside the engine block, where there are no particular problems of space. These devices normally consist of a rod provided with a rack located outside and parallel to the cylinder/piston assembly and engaged by a pawl disposed in the body of the tensioning device and elastically biased against said rack, which is allowed to slide only in the direction of outward travel of the piston and is pulled by the piston in this direction, when the latter protrudes from the cylinder because of slackening of the chain. The rod with rack, being prevented from returning inside the body of the tensioner, forms a stop means for the shoe that acts against the chain, thus preventing the above-mentioned flapping of the chain. In order not to make the system excessively rigid, the rod with rack engages with a shoulder of the piston situated at a certain distance (of the order of a few millimeters) from the free end of the piston, so as to allow a certain degree elasticity of the system, that is, a certain controlled return of the piston.

For a better understanding of the above described device of the prior art, reference can be made to FIG. 1 of the appended drawings.

In so-called cartridge type tensioning devices said solution is not practicable, in that in said devices it is not possible to dispose members that protrude beyond the outer profile of the cylinder. The maximum size of said devices is in fact given by the thread that screws into the threaded hole in the engine block.

For these cartridge type tensioners no-return devices for the piston have been proposed, which, however, prove excessively complicated, costly because of the considerable mechanical working they require, and not entirely reliable.

The object of the invention is to eliminate said drawbacks, providing a tensioning device for chain tensioners of the cartridge type, provided with a no-return device for the piston completely contained within the bulk of the cylinder.

Another object of the invention is that of providing such a cartridge tensioner, in which said no-return device for the piston is of simple and economical design, and is highly reliable.

SUMMARY OF THE INVENTION

A cartridge type tensioner for chain or belt transmission systems is provided. The tensioner includes a body or cylinder with an inner bore and a hollow piston axially slidable in the cylinder under the action of elastic biasing means acting between said cylinder and said piston and of pressurized fluid fed into said bore. The result is that an upper end of the piston acts on a movable shoe to tension a chain or belt. The tensioner further includes a device able to prevent uncontrolled return of said piston into the cylinder, characterized in that on a skirt of the piston at least one longitudinal rack is provided. The rack is engageable by a toothed pad which extends through an aperture formed in a wall of the cylinder and biased by an elastic means housed in a seat of the cylinder, without protruding from the outer profile of said cylinder.

Substantially, according to the invention, at least one set of teeth or rack, extending longitudinally of the piston and accessible through at least one window in the cylinder wall is provided, and in register with said window a toothed pad is disposed, able to engage with the teeth of the rack, so as to allow sliding thereof only in a direction of protrusion of the piston from the cylinder, said pad being elastically biased against the rack by the action of a spring.

The longitudinal extent of the pad is advantageously smaller than the corresponding extent of the aperture or window made in the wall of the cylinder, and the pad is suitably guided in a seat made in the wall of the cylinder, so as to allow the piston a certain play, and thus its possible controlled elastic return.

Alternatively the pad acting against the rack can be mounted without any possibility of axial sliding and a second small piston, axially protruding from the end of the main piston can be provided able to retract in the event of excessive force being exerted against it, thus maintaining the elastic characteristic of the piston.

Further characteristics of the invention will be made clearer by the detailed description that follows, referring to exemplary unrestrictive embodiments thereof, illustrated in the appended drawings, in which:

DETAILED DESCRIPTION OF THE INVENTION

Figure 1:
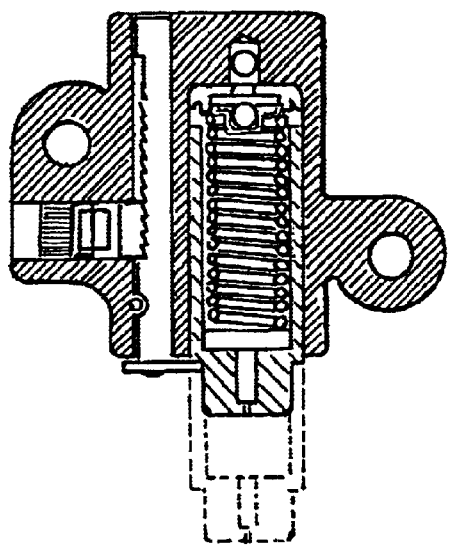
FIG. 1 is a sectional view of a prior art tensioning device, of a type for mounting inside an engine block, as previously described.
Figure 6:
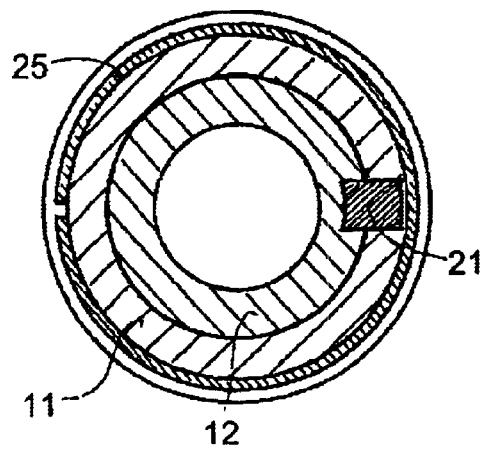
FIG. 6 is a diagrammatic cross sectional view taken along line VI—VI of FIG. 5.
Figure 2:
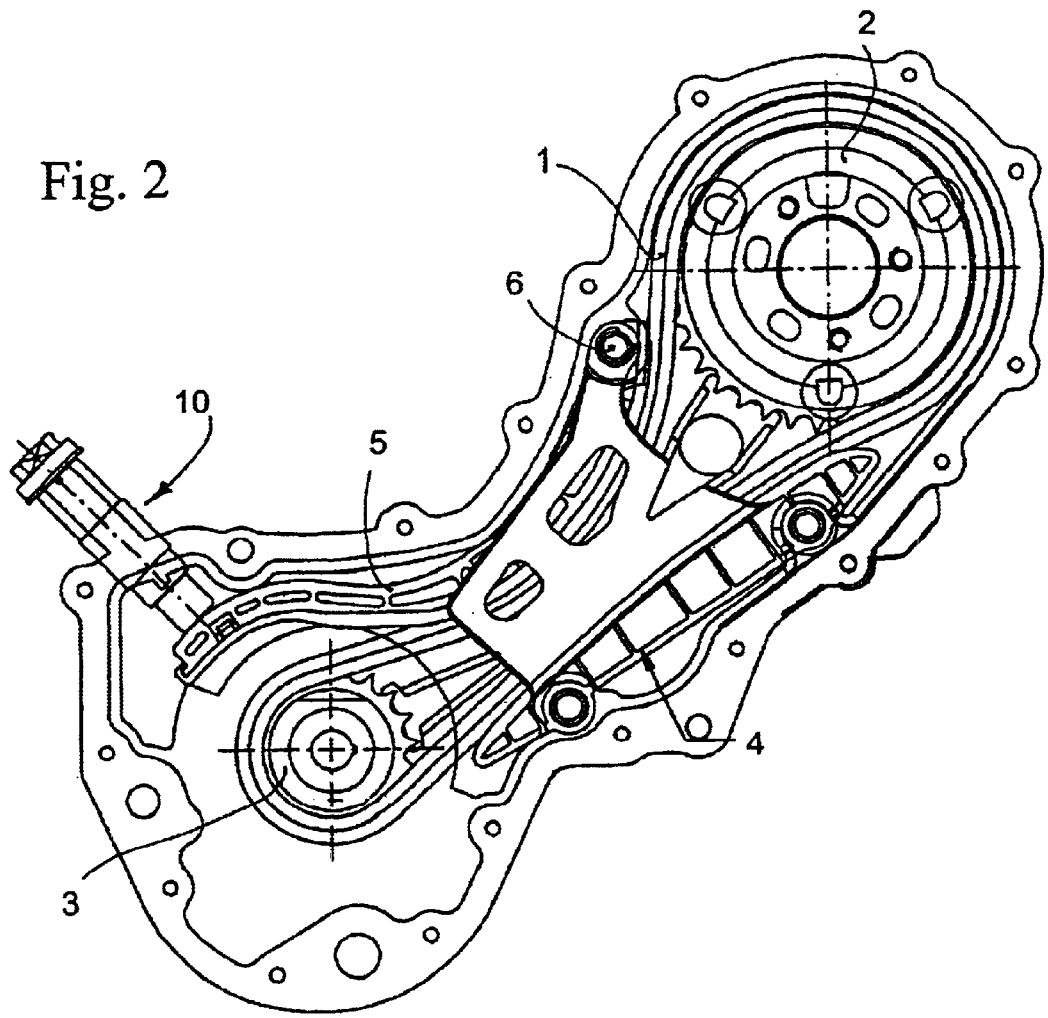
FIG. 2 is a diagrammatic illustration of a chain drive, provided with a tensioning device of the cartridge type.

FIG. 2 diagrammatically shows a chain drive to which the tensioner according to the invention can be applied.

In particular a driving wheel 2 and a driven wheel 3 are shown, on which a chain 1 is wound, a taut branch or run of which (the lower one in the figure) is guided by a suitable guide 4, a slack branch or run (the upper one in the figure) is tensioned by means of a shoe 5, swingable around a pin 6, and pushed against the corresponding run of the chain by a tensioning device, indicated as a whole by reference numeral 10, which in this case is a cartridge tensioner, of the type previously mentioned, that is screwed into the engine block or into the head.

Said tensioner 10 will now be described in greater detail with reference to FIGS. 3 to 7.

The cartridge type tensioner 10 comprises a body or cylinder 11 and a piston 12 slidably housed in a bore 13 of the cylinder 11.

The cylinder 11 has, at the opposite end to that from which the piston 12 extends, a head 14, and a thread 15 on its skirt, in proximity to the head 14, for screwing into a threaded hole in the engine block or in the engine head.

The piston 12 is hollow on the inside and houses a pressure spring 16 acting between a bottom of the bore 13 and a head end 17 of the piston 12.

The bore 13 communicates with a source of pressurized fluid, generally oil, through an opening 18, and a check valve 19, in a manner that is per se known and therefore not described. The valve 19 is normally equipped with a sealing disc 19' that allows a calibrated return of the fluid to impart a certain degree of dampening or elasticity to the piston 12.

The combined action of the spring 16 and of the pressurized fluid in the bore 13 tends to push the piston 12 out of the cylinder 11, so that the piston 12 acts with its head end 17 against the shoe 5, thus keeping the chain 1 correctly tensioned.

In order to prevent uncontrolled re-entry of the piston 12 into the cylinder 11, in the event of even partial emptying of the bore 13, in accordance with the invention there is on the piston sleeve 12 at least one longitudinal rack 20 with which a toothed pad 21 engages, passing through an aperture 22 formed in the side wall of the cylinder. The axial or longitudinal extent of the toothed pad 21 is less than the corresponding extent of the aperture 22, so that said pad can have a certain axial sliding, guided by a pad base 23, which slides in a corresponding seat 24 formed in the wall of the cylinder 11, adjacent the aperture 22.

The pad 21 is pressed against the rack 20 by the action of a spring 25 consisting in particular of an open annular ring of spring steel which is fitted in a corresponding annular seat 26 formed in the wall of the cylinder and having a width substantially corresponding to the sum of the longitudinal dimensions of said aperture 22 and of said seat 24. In this manner, the spring 25 is disposed above the pad 21, keeping it constantly pressed against the teeth of the rack 20, so as to prevent uncontrolled reentry of the piston 12, except for take-up of slack due to the pad 21 being housed loosely in the aperture 22.

In the appended figures a single rack 20 involving a small portion of the circumference of the piston 12 is shown. It is nevertheless clear that a plurality of parallel racks can be provided on the sleeve of the piston 12, or even a single rack extending for the whole circumference of the piston. Correspondingly a plurality of toothed pads 21, housed in an equal number of apertures 22 provided circumferentially in the wall of the cylinder 11, or a single pad with a plurality of circumferentially spaced sets of teeth can be provided. The biasing action against the rack would again be exerted by the spring 25 in the form of a split ring or the like.

As can be seen from the appended figures, an annular cavity 30 is provided on the skirt of the piston 12, near the head end 17 thereof, whilst two other annular cavities 31 and 32 of different sizes are formed on the inside of the wall of the cylinder 11, near the free end thereof opposite to the head 14.

Between said cavities of the piston and of the cylinder a split ring 33 is interposed, which elastically presses against the inner wall of the cylinder.

Figure 3:
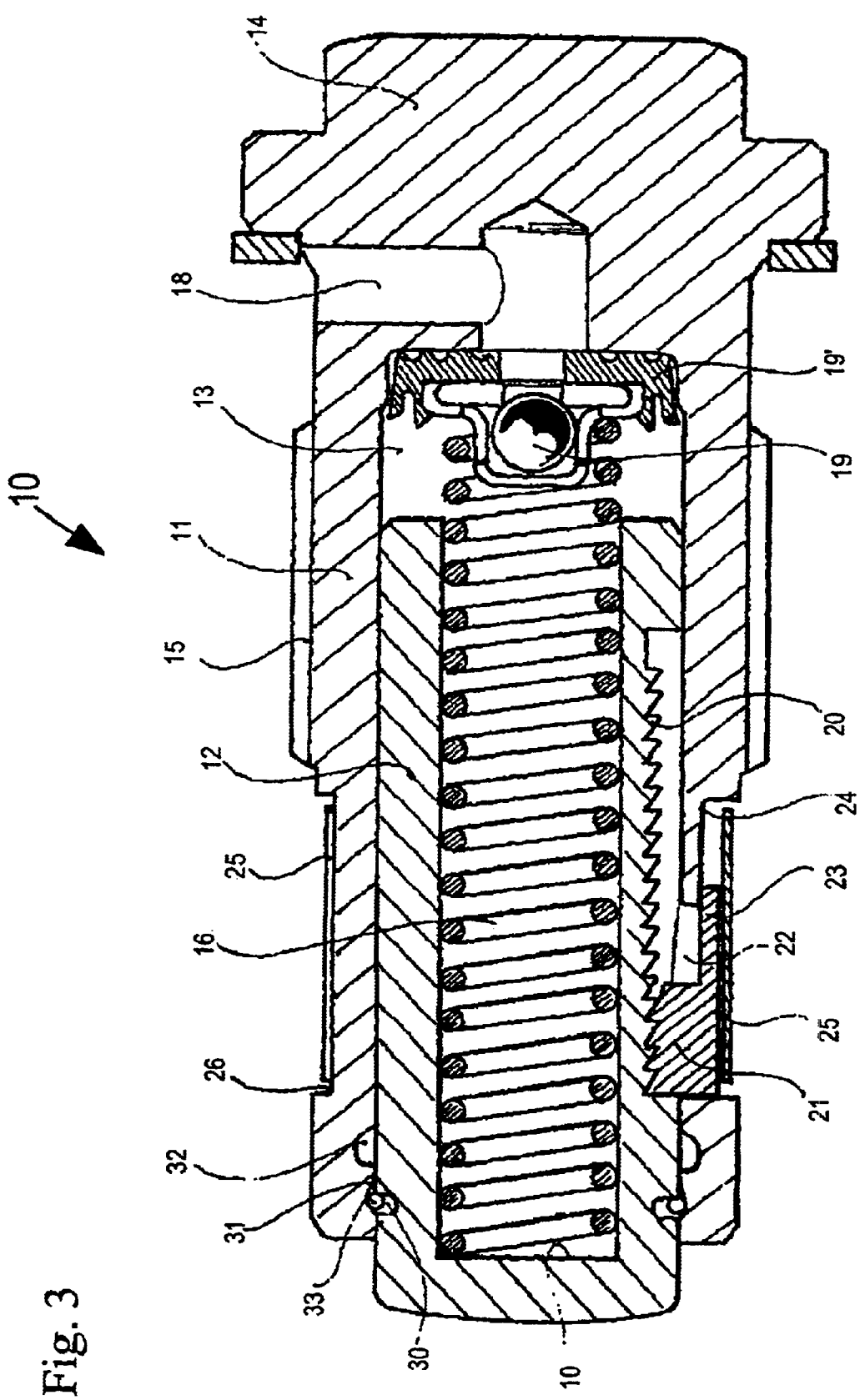
FIG. 3 is a diagrammatic axial sectional view of a cartridge type tensioner according to the invention, before fitting.

When the tensioner 10 is assembled, before being mounted onto the engine block, it appears as shown in FIG. 3, that is with the elastic ring 33 interposed between the cavity 30 of the piston and the smaller cavity 31 of the cylinder, sticking into the latter cavity, preventing the piston from leaving the cylinder.

When the tensioner is mounted by screwing into the engine block, the upper end 17 of the piston abuts against the shoe 5, so that the piston tends to re-enter the cylinder, pulling with it the split ring 33, which slides along a ramp of the seat 31, until it is disposed in the larger seat 32 of the cylinder, where it remains definitively, thus freeing the piston 12 and allowing free movement thereof outward from the cylinder, to compensate for slackening of the chain.

Figure 4:
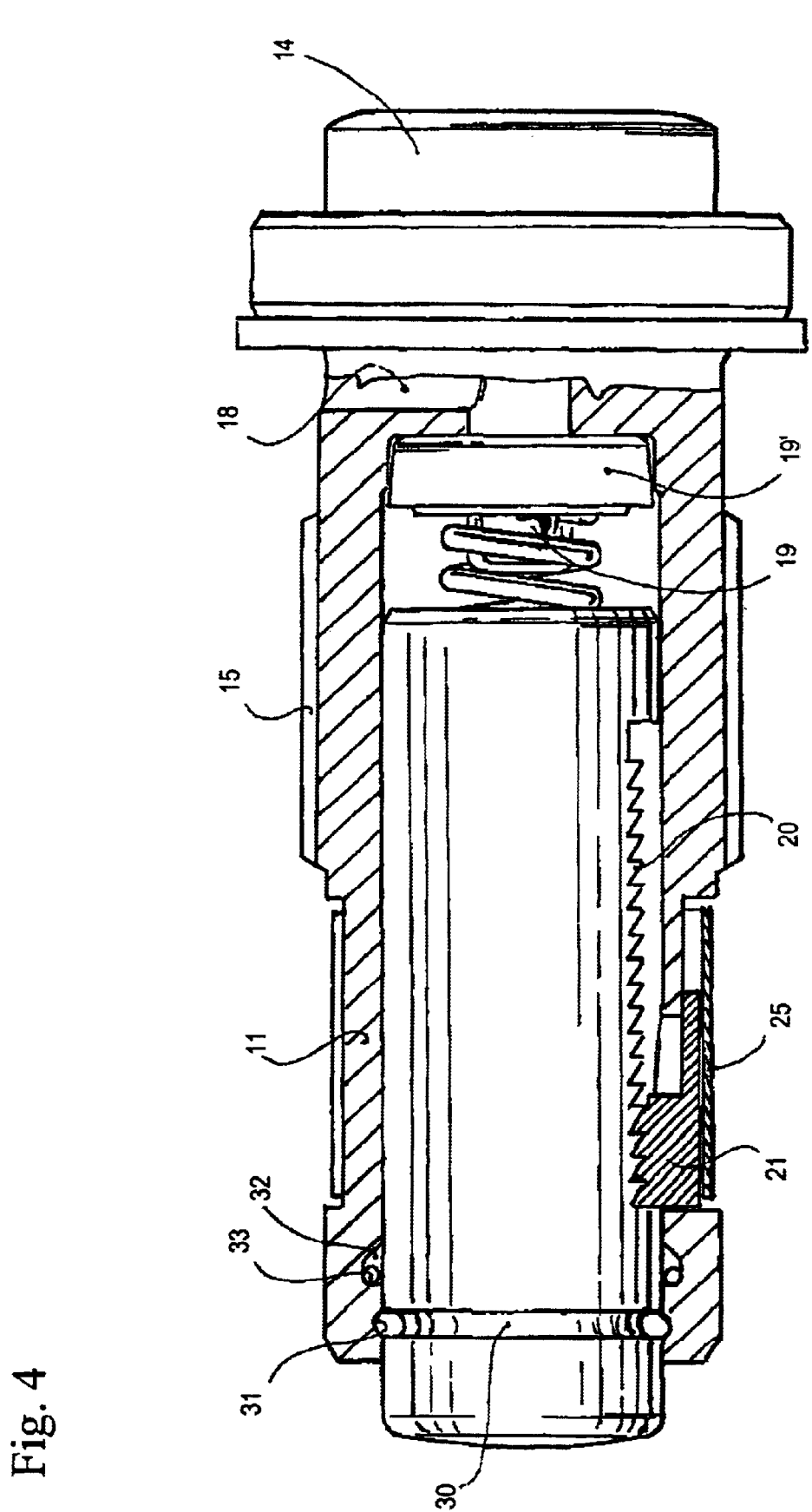
FIG. 4 is a similar view to that of FIG. 3, showing the tensioner after fitting.

FIG. 4, on the other hand, shows the tensioner 10 in the position after fitting in the engine block, with the piston protruding from the cylinder for a small portion of its length.

Figure 5:
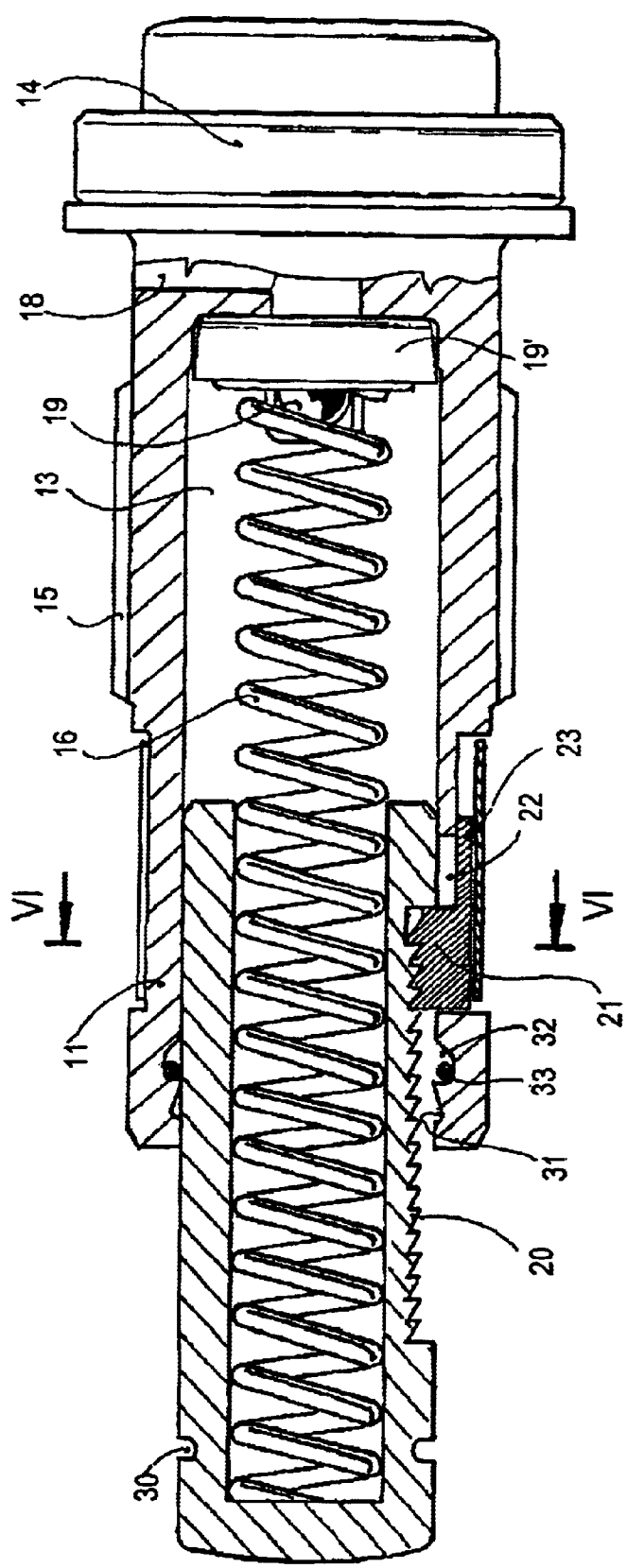
FIG. 5 is another view similar to that of FIG. 3, with piston in the state of maximum extension from the cylinder.
Figure 7:
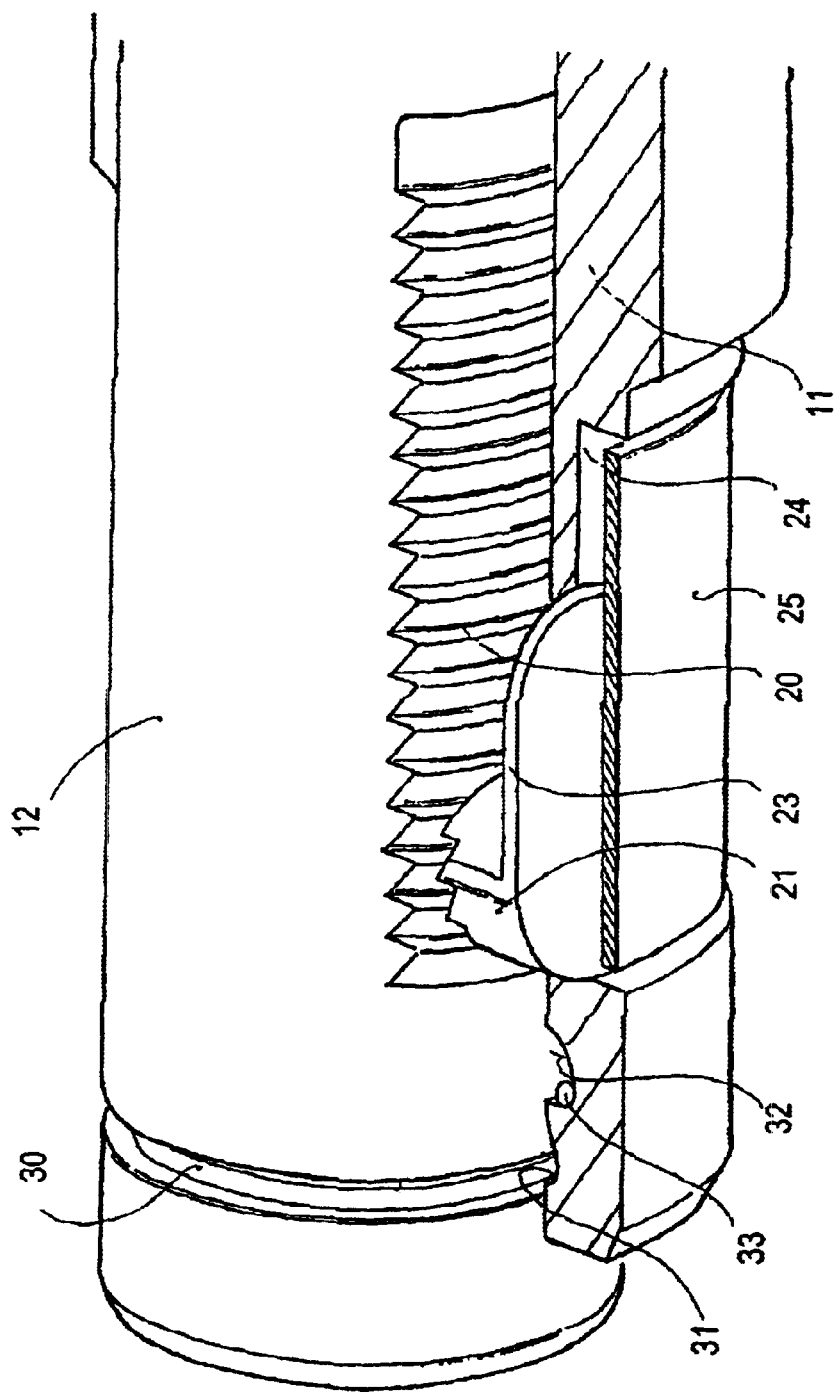
FIG. 7 is a partial axonometric cutaway view of the tensioner according to the invention.
Figure 8:
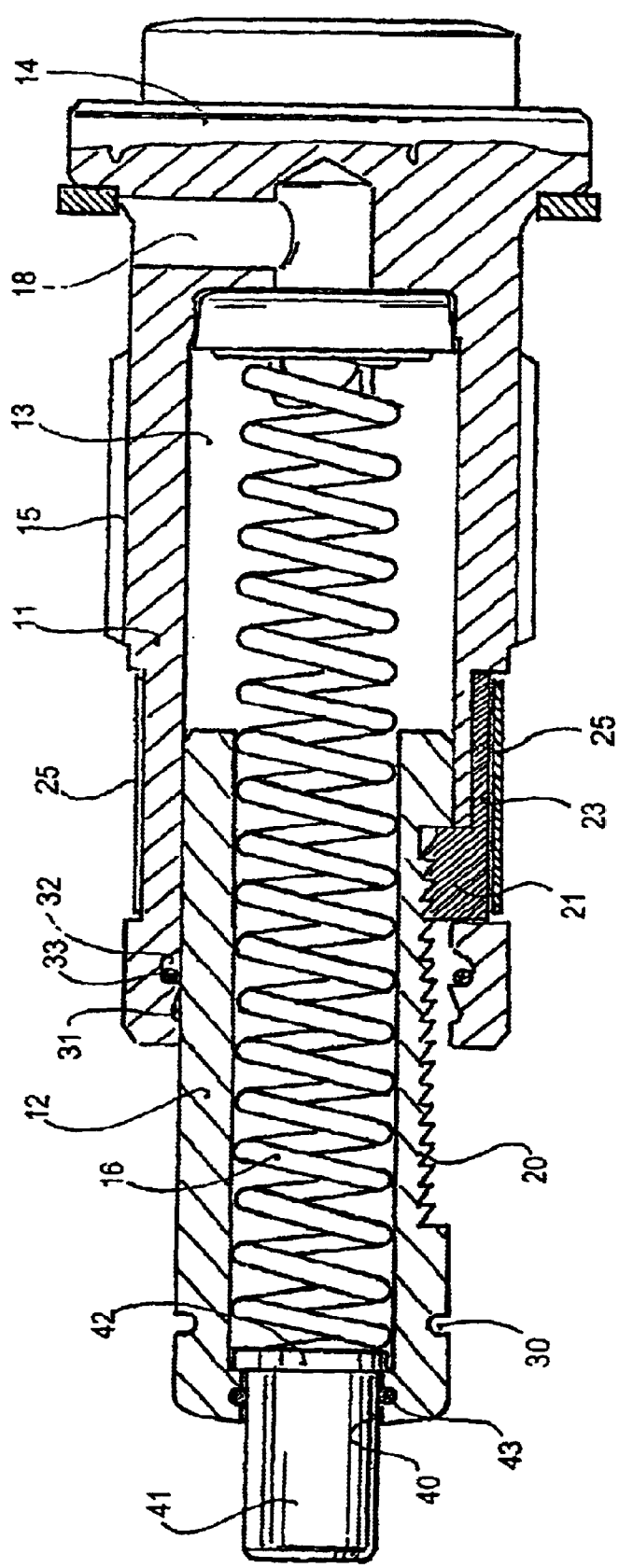
FIG. 8 is an axial sectional view like that of FIG. 5, showing a different embodiment.

FIG. 5, on the other hand, shows the tensioner with the piston in the position of maximum outward travel from the cylinder, and thus at the end of its stroke.

In the embodiment in FIG. 5, the toothed pad 21 is not provided with the possibility of axial sliding, for example by making it of the same length as the aperture 22 and/or lengthening its base 23 to bring it into abutment with the shoulder of the corresponding seat 24, as shown in the figure.

In this case a hole 40 is provided at the head end 17 of the piston 12 for passage of a small piston 41, whose base 42 abuts internally against said head end 17 of the main piston 12, biased by the screw 16 and by the action of the pressurized fluid in the bore 13.

An O-ring 43 is inserted in an annular groove of said hole 40 to ensure the seal of the small piston 41.

With this solution the elasticity of the piston, that is, the capacity to return slightly inside the cylinder if the need be, is left to the small piston 41, which in fact tends to retract into the piston 12 when a force greater than the combined action of the spring 16 and the fluid in the bore 13 is exerted thereupon from the outside.

What is claimed is:

1. A cartridge tensioner for chain or belt transmission systems, comprising a body or cylinder (11) with an inner bore (13) and a hollow piston (12) axially slidable in the cylinder under the action of elastic biasing means (16) acting between said cylinder and said piston and of pressurized fluid fed into said bore (13), so that an upper end (17) of the piston acts on a movable shoe (5) to tension a chain or belt (1) and also comprising a device able to prevent uncontrolled return of said piston (12) into the cylinder, characterized in that on a skirt of the piston (12) at least one longitudinal rack (20) is provided, engageable by a toothed pad (21) extending through an aperture (22) formed in a wall of the cylinder and biased by an elastic means (25) housed in a seat (26) of the cylinder (11), without protruding from the outer profile of said cylinder, a longitudinal extent of said toothed pad (21) being smaller than a corresponding longitudinal extent of said aperture (22) formed in the wall of the cylinder (11) so that said pad has a certain degree of longitudinal sliding and thus allowing controlled re-entry of the piston (12) into the cylinder (11) said toothed pad (21) further having an elongated base (23) housed in a corresponding seat (24) in the wall of the cylinder (11) for guided sliding of said pad (21).

2. A tensioner according to claim 1, characterized in that at the upper end (17) of said piston (12) is a small piston (41) of a set length, which abuts against the shoe (5) and is retractable into the hollow piston (12) in the event of an inward bias greater than the joint action of said elastic means (16) and said pressurized fluid in the bore (13).

3. A tensioner according to claim 1, characterized in that between the skirt of the piston (12) and the inner surface of the cylinder (11) engagement means (30–33) are provided able to prevent outward travel of the piston from the cylinder before fitting of the tensioner in an engine block and to allow outward travel thereof after fitting.

4. A tensioner according to claim 3, characterized in that said engagement means comprise an annular cavity (30) formed in the sleeve of the piston (12) and two cavities of different size and differently shaped (31, 32) formed in the inner surface of the cylinder (11), an elastic ring (33) being initially interposed between said cavities (31, 32) to prevent outward travel of the piston from the cylinder, said elastic ring (33) being movable into the other larger cavity (32) of the cylinder (11), thus freeing the piston (12) if the piston is made to slide slightly toward the inside of the cylinder.

5. A tensioner according to claim 1, characterized in that said cylinder (1) has an outer thread (15) for screwing into a corresponding threaded hole provided in an engine block or in an engine head.

6. A tensioner according to claim 1, characterized in that said elastic means (25) is a spring consisting of an open annular ring, that covers said toothed pad (21) and is fitted in said seat (26) which extends annularly the wall of the cylinder (11).

7. A tensioner according to claim 1, characterized in that a longitudinal extent of said toothed pad (21) is smaller than a corresponding longitudinal extent of said aperture (22) formed in the wall of the cylinder (11) so that said pad has a certain degree of longitudinal sliding and thus allows controlled re-entry of the piston (12) into the cylinder (11).

8. A chain drive, comprising:
   a plurality of sprockets;
   a chain, engaging said sprockets;
   at least one cartridge tensioner, comprising:
      a body or cylinder (11) with an inner bore (13); and
      a hollow piston (12) axially slidable in the cylinder under the action of elastic biasing means (16) acting between said cylinder and said piston and of pressurized fluid fed into said bore (13), so that an upper end (17) of the piston acts on a movable shoe (5) to tension the chain; and
   a device able to prevent uncontrolled return of said piston (12) into the cylinder, characterized in that on a skirt of the piston (12) at least one longitudinal rack (20) is provided, engageable by a toothed pad (21) extending through an aperture (22) formed in a wall of the cylinder and biased by an elastic means (25) housed in a seat (26) of the cylinder (11), without protruding from the outer profile of said cylinder, a longitudinal extent of said toothed pad (21) is smaller than a corresponding longitudinal extent of said aperture (22) formed in the wall of the cylinder (11) so that said pad has a certain degree of longitudinal sliding and thus allows controlled re-entry of the piston (12) into the cylinder (11), said toothed pad (21) further having an elongated base (23) housed in a corresponding seat (24) in the wall of the cylinder (11) for guided sliding of said pad (21).

9. A chain drive according to claim 8, characterized in that at the upper end (17) of said piston (12) is a small piston (41) of a set length, which abuts against the shoe (5) and is retractable into the hollow piston (12) in the event of an inward bias greater than the joint action of said elastic means (16) and said pressurized fluid in the bore (13).

10. A chain drive according to claim 8, characterized in that between the skirt of the piston (12) and the inner surface of the cylinder (11) engagement means (30–33) are provided able to prevent outward travel of the piston from the cylinder before fitting of the tensioner in an engine block and to allow outward travel thereof after fitting.

11. A chain drive according to claim 10, characterized in that said engagement means comprise an annular cavity (30) formed in the sleeve of the piston (12) and two cavities of different size and differently shaped (31, 32) formed in the inner surface of the cylinder (11), an elastic ring (33) being initially interposed between said cavities (31, 32) to prevent outward travel of the piston from the cylinder, said elastic ring (33) being movable into the other larger cavity (32) of the cylinder (11), thus freeing the piston (12) if the piston is made to slide slightly toward the inside of the cylinder.

12. A chain drive according to claim 8, characterized in that said cylinder (1) has an outer thread (15) for screwing into a corresponding threaded hole provided in an engine block or in an engine head.

13. A chain drive according to claim 8, characterized in that said elastic means (25) is a spring consisting of an open annular ring, that covers said toothed pad (21) and is fitted in said seat (26) which extends annularly in the wall of the cylinder (11).

14. A chain drive according to claim 8, characterized in that a longitudinal extent of said toothed pad (21) is smaller than a corresponding longitudinal extent of said aperture (22) formed in the wall of the cylinder (11) so that said pad has a certain degree of longitudinal sliding and thus allows controlled re-entry of the piston (12) into the cylinder (11).

* * * * *